(12) United States Patent
Zhang

(10) Patent No.: US 8,454,922 B2
(45) Date of Patent: Jun. 4, 2013

(54) METHOD AND APPARATUS USING CARBON NANOTUBES FOR HYDROGEN STORAGE

(75) Inventor: Ruiqin Zhang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 24 days.

(21) Appl. No.: 12/501,098

(22) Filed: Jul. 10, 2009

(65) Prior Publication Data

US 2011/0008239 A1 Jan. 13, 2011

(51) Int. Cl.
*D01F 9/12* (2006.01)

(52) U.S. Cl.
USPC .............. 423/447.1; 423/445 B; 977/742; 977/842

(58) Field of Classification Search
USPC .............. 423/445 B, 447.1; 977/742, 842
See application file for complete search history.

(56) References Cited

U.S. PATENT DOCUMENTS

2005/0118091 A1* 6/2005 Cooper et al. ............. 423/447.1

OTHER PUBLICATIONS

Effect of curvature and chirality for hydrogen storage in single-walled carbon nanotubes: A Combined ab initio and Monte Carlo investigation Giannis Mpourmpakis, George E. Froudakis, George P. Lithoxoos, and Jannis Samios, J. Chem. Phys. 126, 144704 (2007), DOI:10.1063/1.2717170.*

Chirality selection of single-walled carbon nanotubes by laser resonance chirality selection method Kenzo Maehashi, Yasuhide Ohno, Koichi Inoue, and Kazuhiro Matsumoto, Appl. Phys. Lett. 85, 858 (2004), DOI:10.1063/1.1778471.*

Arellano, et al., "Interaction of molecular and atomic hydrogen with (5,5) and (6,6) single-wall carbon nanotubes," Journal of Chemical Physics, vol. 117, No. 5, Aug. 1, 2002, pp. 2281-2288.

Kostov, et al., "Influence of Carbon Curvature on Molecular Adsorptions in Carbon-Based Materials: A Force Field Approach," Physical Review Letters, vol. 89, No. 14, Sep. 30, 2002, pp. 146105-1-146105-4.

Cheng, et al., "Mechanism of Hydrogen Sorption in Single-Walled Carbon Nanotubes," J. Am. Chem. Soc. 123, 2001, pp. 5845-5846.

Han, et al., "Adsorption properties of hydrogen on (10,0) single-walled carbon nanotube through density functional theory," Carbon, No. 42, 2004, pp. 2169-2177.

Okamoto, et al., "Ab Initio Investigation of Physisorption of Molecular Hydrogen on Planar and Curved Graphenes," J. Phys. Chem. B, No. 105, 2001, pp. 3470-3474.

Henwood, et al., "Ab initio investigation of molecular hydrogen physisorption on graphene and carbon nanotubes," Physical Review B, No. 75, 2007, pp. 245413-1-245413-10.

Ferre-Vilaplana, et al., "Ab initio computational investigation of physisorption of molecular hydrogen on achiral single-walled carbon nanotubes," The Journal of Chemical Physics, No. 122, 2005, pp. 214724-1-214724-7.

Mpourmpakis, et al., "Effect of curvature and chirality for hydrogen storage in single-walled carbon nanotubes: A Combined ab initio and Monte Carlo investigation," The Journal of Chemical Physics, No. 126, 2007, pp. 144704-1-14470-10.

Račkauskas, Simas, "Carbon nanotube growth and use in energy sector," Energetika, Nr. 2, 2006, pp. 43-46.

(Continued)

*Primary Examiner* — Stuart Hendrickson
*Assistant Examiner* — Richard M Rump
(74) *Attorney, Agent, or Firm* — Heslin Rothenberg Farley & Mesiti P.C.

(57) ABSTRACT

A method of storing hydrogen using carbon nanotubes having a diameter ranging from 0.6-0.8 nm. The hydrogen may be stored in a container which is made of another material. The carbon nanotubes may be provided inside the container for adsorbing the hydrogen.

19 Claims, 8 Drawing Sheets

OTHER PUBLICATIONS

Nikitin, et al., "Hydrogen Storage in Carbon Nanotubes through the Formation of Stable C-H Bonds," Nano Letters, vol. 8, No. 1, 2008, pp. 162-167.

Dillon, et al., "Storage of hydrogen in single-walled carbon nanotubes," Nature, vol. 386, Mar. 27, 1997, pp. 377-379.

Liu, et al., "Hydrogen Storage in Single-Walled Carbon Nanotubes at Room Temperature," Science, vol. 286, Nov. 5, 1999, pp. 1127-1129.

Ye, et al., "Hydrogen adsorption and cohesive energy of single-walled carbon nanotubes," Applied Physics Letters, vol. 74, No. 16, Apr. 19, 1999, pp. 2307-2309.

Sapirstein, et al., "Raman Analysis of Singe-Walled Carbon Nanotube (SWCNT) Films," The Application Notebook, Advertising Supplement, Molecular Spectroscopy, No. 19, Sep. 2007, 1 page.

Dillon, et al., "Carbon Nanotube Materials for Hydrogen Storage," Proceeding of the 2001 DOE Hydrogen Program Review, National Renewable Energy Laboratory, Golden, CO, 17 pages.

Dillon, et al., "Hydrogen Storage in Carbon Single-Wall Nanotubes," Proceedings of the 2002 U.S. DOE Hydrogen Program Review, National Renewable Energy Laboratory, Golden, CO, pp. 1-17.

Lu, Chenguang and Liu, Jie, "Controlling the Diameter of Carbon Nanotubes in Chemical Vapor Deposition Method by Carbon Feeding," J. Phys. Chem. B, vol. 110, No. 41, 2006, cover page and pp. 20254-20257.

Liu, et al., "Hydrogen Storage in Single-Walled Carbon Nanotubes at Room Temperature," www.sciencemag.org, SCIENCE, vol. 285, Nov. 5, 1999, cover page and pp. 1127-1129.

* cited by examiner

METHOD AND APPARATUS USING CARBON NANOTUBES FOR HYDROGEN STORAGE

FIELD OF THE INVENTION

The present invention relates to a method and apparatus which uses carbon nanotubes (CNT) for hydrogen storage.

BACKGROUND OF THE INVENTION

Developing clean and renewable energy sources has attracted more and more attention, due to $CO_2$-exacerbated climate change, depletion of fossil fuels, and vehicle-related air pollution. Hydrogen is one of the most promising energy fuels for automobiles and has potential applications to smaller portable devices, like mobile phones. However, up to now hydrogen has not been used in great extent, for several technological issues. One of the main reasons limiting hydrogen usage is the difficulty of storage and delivery. To achieve a widespread usage of hydrogen as a fuel and versatile energy carrier, developing feasible chemical technologies for storage systems and large-scale hydrogen production is required.

The U.S. Department of Energy (DOE) has specified targets for hydrogen storage. The targets of the hydrogen storage capacities for year 2010 are 6 wt % and more than 0.045 kg of hydrogen per liter. Both gas compression and liquefaction of hydrogen methods are inefficient and unsuitable for the purpose of hydrogen storage since neither has met the capacity target set by the DOE.

Solid state storage of hydrogen in lattice interstitial sites is another solution that may provide high storage densities. Metals and metal alloys have been tested as hydrogen storage materials. Unfortunately, none of over 2000 known materials which can form metal hydrides satisfy all the essential requirements and have been unable to meet all of the DOE targets. Furthermore, metal hydrides are expensive and heavy, which makes them unsuitable for mobile applications. They need high desorption temperatures, and $MgH_2$ desorbs hydrogen at a high temperature of 573 K. Ideally, desired decomposition temperature for a hydride is comparable to the waste heat of the fuel cell, which ranges from 60 to 120° C.

Gas-on-solid adsorption of hydrogen on nanostructured materials has attracted considerable attention, for a high storage density and the safe nature. Due to the considerable surface area, carbon-based nanostructures, such as graphite, graphene layer, and carbon nanotubes, appear to be suitable candidate materials for storing hydrogen.

There is considerable debate within the literature concerning whether the carbon-based nanomaterials are suitable to store a practically viable amount of hydrogen within technologically viable conditions. To date there is no agreement on this point.

SUMMARY OF THE INVENTION

For storing hydrogen physisorption is preferable to chemisorption which requires a large input of energy to overcome the chemical bonds between the hydrogen and the adsorbate. Since physisorption is mainly dependent on electrostatic and weak van der Waals interactions, the binding energy is much smaller than that of chemisorption. None-the-less the physisorption binding energy needs to be relatively high in order to maintain a stable binding for storage. In terms of physisorption energy, the larger the negative value the 'higher' the binding energy; so e.g. −0.2 eV is considered to be a higher binding energy than −0.1 eV.

Through theoretical modeling and analysis the inventor has determined that the diameter of the nanotubes has an important effect on the absorption and storage properties. In particular the inventor proposes that carbon nanotubes having a small diameter will have better storage properties.

A first aspect of the present invention is a method of storing hydrogen using carbon nanotubes having a diameter ranging from 0.6 to 0.8 nm, the full width at half maximum (FWHM) distribution of the diameter of the carbon nanotubes being greater than zero but equal to or less than 0.2 nm. The inventor has found that at these diameters the binding energy is unexpectedly high. Preferably the diameter of the nanotubes ranges from 0.5 to 0.79 nm (to the nearest significant figure). Alternatively the diameter of the nanotubes may be in the range 0.5 to 0.7 nm, or 0.55 to 0.75 nm, or 0.6 to 0.78 nm. More preferably the diameter ranges from 0.6 to 0.7 nm; the binding energy in that range being especially advantageous.

It is envisaged that the nanotubes could have diameters of 0.6, 0.61, 0.62, 0.63, 0.64, 0.65, 0.68, 0.69, 0.7, 0.71, 0.72, 0.73, 0.74, 0.75, 0.76, 0.77, 0.78 or 0.79 could be used or any range encompassing some or all of those diameters. Nanotube applications often use a heterogeneous bundle of nanotubes including tubes having a wide range of different diameters. However, the inventor has realized that in the context of hydrogen storage this may be detrimental to the storage performance. Therefore it is preferred that the full width at half maximum distribution of the tube diameter is 0.2 nm or less, or 0.1 nm or less.

The carbon nanotubes may be pure carbon nanotubes; it is not necessary for the carbon to be doped. The nanotubes may be of any desired type, e.g. armchair, zigzag or chiral nanotubes. Preferably the carbon nanotubes are single walled nanotubes (SWCNT).

The hydrogen may be stored in gaseous or liquid form. The hydrogen may be stored in a container comprising carbon nanotubes. Generally the container will be made of another material, an arrangement of carbon nanotubes will be provided inside the container and the hydrogen will be adsorbed by the carbon nanotubes.

The hydrogen may be moderately pressured for storage or stored at ambient pressure; the hydrogen may be stored at room temperature or a temperature below room temperature. The hydrogen may be moderately pressured (e.g. less than 10 MPa) either before it is placed in the container or after being placed in the container, in order to aid adsorption. The hydrogen may be released from storage by heating and/or reducing pressure.

A second aspect of the present invention is a container for storing hydrogen, the container comprising carbon nanotubes having a diameter from 0.6 to 0.8 nm, the full width at half maximum (FWHM) distribution of the diameter of the carbon nanotubes being greater than zero but equal to or less than 0.2 nm. Preferably the container is made of a first material other than carbon nanotubes and the carbon nanotubes are provided inside the container in an arrangement for adsorbing hydrogen.

The carbon nanotubes may have any of the diameters or other qualities mentioned above in the first aspect of the invention. The container is preferably arranged for storing hydrogen in compressed gaseous or liquid form. The container may comprise a device for varying the pressure and/or a heater for heating the hydrogen prior to release of the hydrogen.

A third aspect of the present invention provides the container of the second aspect of the invention in combination with hydrogen stored in the container. The hydrogen may be in liquid or gaseous form; the hydrogen may be compressed or pressurized.

DETAILED DESCRIPTION OF THE INVENTION

Figure 1:
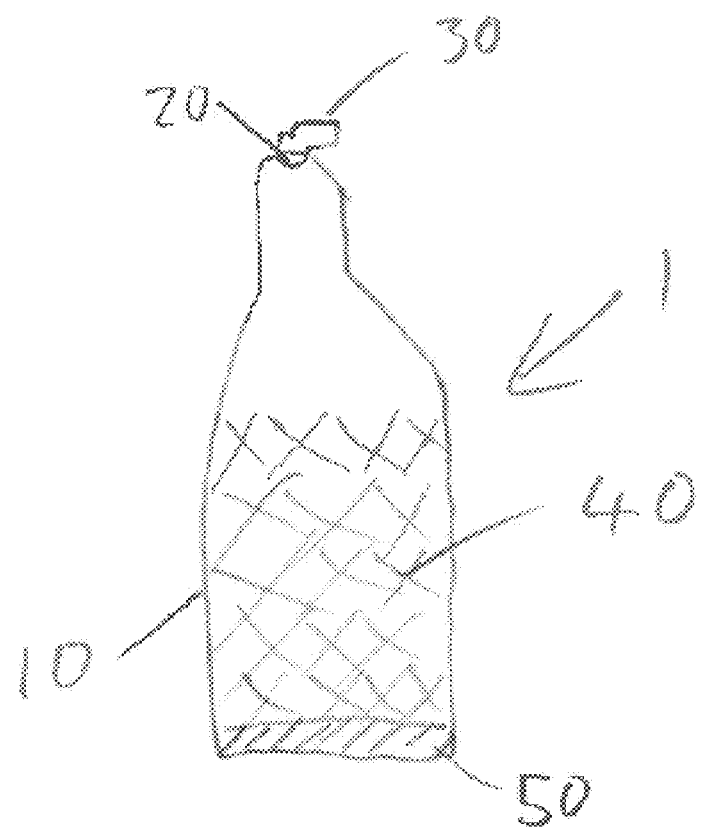
FIG. 1 is a schematic view of a container for storing hydrogen.

FIG. 1 shows a container 1 for storing hydrogen. The container has walls 10 made of metal, ceramic, glass or a material other than carbon nanotubes. Inside the container is an arrangement of carbon nanotubes for adsorbing hydrogen. The carbon nanotubes have a diameter ranging from 0.6 to 0.79 nm. The container has a nozzle 30 dispensing hydrogen and varying pressure and a valve 20 for regulating the nozzle. A device 50 for varying the temperature of the container is also provided.

Theoretical analysis and reasons for choosing particular diameters of the nanotubes will now be discussed. In general it is important that the binding energy of the hydrogen to the carbon nanotubes is low so that the hydrogen may be released easily.

First we consider the Lennard Jones dispersion correction scheme for studying the interaction between $H_2$ and CNT which is a typical π-involved weak interaction. We adopted the self-consistent charge DFTB method (SCC-DFTB), as implemented in the DFTB+ code. To describe the van der Waals interaction, we considered the Lennard Jones dispersion correction scheme with the Rappé's universal force field (UFF). The parameters for the potential can be entered by the user or just take the parameters of the Rappé's universal force field (UFF) in which the van der Waals contribution is only considered for interatomic interactions where the two atoms are not adjacent to each other or to a common neighbor. The UFF technique has been proposed to avoid the problems with the short-range part of a posteriori-added van der Waals potential. This implementation takes advantage of available Lennard-Jones parameters of the UFF force field, which are optimized to reproduce van der Waals distance, well depth, and local curvature and the parameters are available from H to Lw.

The Lennard-Jones dispersion model in our SCC-DFTB code uses the following potential:

$$U_{ij}(r) = d_{ij}\left[-2\left(\frac{r_{ij}}{r}\right)^6 + \left(\frac{r_{ij}}{r}\right)^{12}\right](r \geq r_0) \quad (1)$$

$$U_{ij}^{short\text{-}range}(r) = U_0 - U_1 r^5 - U_2 r^{10}(r < r_0) \quad (2)$$

$$r_0 = 2^{-1/6} r_{ij} \quad (3)$$

where $r_0$ marks the distance, at which the potential turns from repulsive to attractive. The parameters $d_{ij}$ and $r_{ij}$ are built from atom type specific parameters $d_i$, $d_j$ and $r_i$, $r_j$ via geometry mean ($d_{ij}=d_i\times d_j$, $r_{ij}=r_i\times r_j$). The parameters $U_0$, $U_1$, and $U_2$ are determined to ensure a smooth transition at $r_0$. For $r_i$ and $r_j$ we use the original parameters of the Universal Force Field (UFF). In UFF, the van der Waals term is set to zero for those interatomic interactions where the atoms are adjacent to each other or to a common neighbor atom. The UFF provides dispersion parameters for nearly every element. Furthermore the parameters are coordination independent and enable, therefore, uncomplicated geometry relaxation or molecular dynamics.

It has been demonstrated that this method predicts results for $H_2$/PAH (polycyclic aromatic hydrocarbon) interactions in close agreement with MP2 and higher-level ab initio methods. The predicted bulk properties of graphite also compare well with the experimental data.

For $H_2$/benzene system, our approach predicts that $H_2$/benzene interaction energy to be $-0.87$ kcal mol$^{-1}$ ($-0.038$ eV) and the intermolecular equilibrium distance between benzene ring and the mass centre of $H_2$ to be 3.2 Å. And our results agree very well with the MP2/cc-pVTZ CCSD(T)/cc-pVTZ results, demonstrating the reliability of the SK-files and the dispersion parameters.

Figure 2:
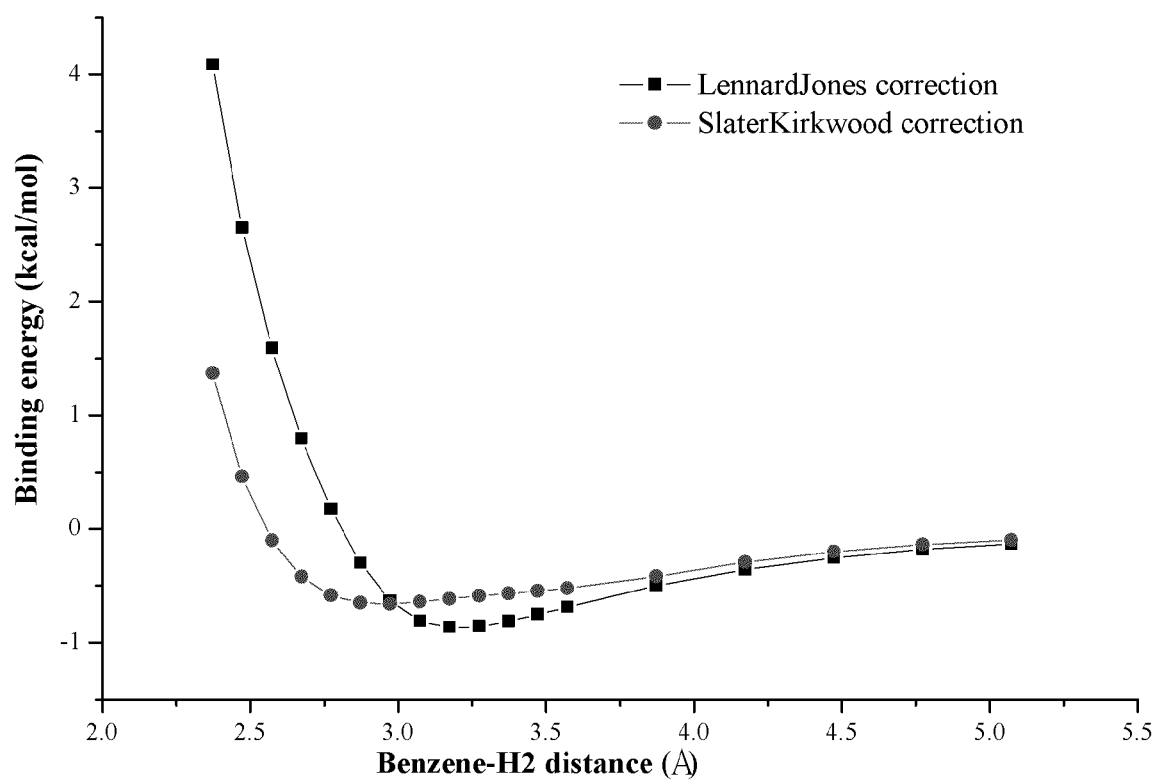
FIG. 2 is a graph showing the potential energy surface for $H_2$ motion along the $C_6$ axis.

FIG. 2 show the comparisons of the potential energy surface of $H_2$ perpendicularly moves to benzene ring, predicted by two different dispersion correction schemes implemented in our SCC-DFTB-methods: Lennard Jones type correction (a) and Slater Kirkwood correction (b). The same the SK-files and the dispersion parameters were used for the calculations. Lennard Jones type correction predicts the binding energy of $-0.87$ kcal mol$^{-1}$ ($-0.038$ eV) at a distance of 3.2 Å between the mass center of $H_2$ and the benzene ring, which agrees very well with the MP2/cc-pVTZ and CCSD(T)/cc-pVTZ results. While, the Slater Kirkwood correction predicts smaller binding energy of $-0.66$ kcal/mol ($-0.029$ eV), and the equilibrium is about 6% shorter than that by Lennard Jones type correction. So when dealing with the $H_2$ and carbon nanostructures, we are confident that the Lennard Jones type correction is more reliable, and we will use the SCC-DFTB-D (Lennard Jones) to study the physisorption hydrogen molecules on SWNTs.

The initial structure model of zigzag (n, 0) CNT was a cluster-type which is 3 times length of the pristine unit cell. To minimize the system energy and ensure swift self-consistent, the dangling bonds at both ends were saturated with hydrogen atoms, following the formula $C_{12n}H_{2n}$. For example, for (10, 0) CNT, the $C_{120}H_{20}$ with tube length around 11 Å was used. And it was reported that for shorter segments of nanotube, hydrogen adsorption will be affected by the terminating hydrogen atoms. For armchair (n, n) CNT, 5 times length of the pristine unit cell was used. Still the terminal dangling carbons at both ends were saturated at the end by hydrogen atoms, following the formula $C_{20n}H_{4n}$ correspondingly. For (5, 5) CNT, a $C_{100}H_{20}$ tube with length around 10 Å was used in our work. After full geometry relaxation with Maxim force component of 1.0e-4 and SCC tolerance of 1e-5, the optimized bond length are 0.74 Å and 1.43 Å for H—H bonds and C—C bonds of both (10, 0) and (5, 5) CNT, which are in excellent agreement with the experimental values of 0.74 Å for H—H and 1.42 for C—C bond, all demonstrating the reliability of this SCC-DFTB-D code.

The binding energy $E_b$ of $H_2$ to the nanotube can be calculated from the molecular energies by the following equation:

$$E_b = E_{CNT-H2} - E_{CNT} - E_{H2} \quad (4)$$

where $E_{CNT-H2}$ represents the total energy of the CNT and $H_2$ complexes, $E_{H2}$ is the energy of the isolated hydrogen molecule, and $E_{CNT}$ is the energy of isolated carbon nanotube. A negative binding energy demonstrates attraction between the two molecules, while a positive binding energy indicates repulsion force between the two molecules.

Binding Energies and Binding Distances for Different Adsorption Sites

Figure 3A:
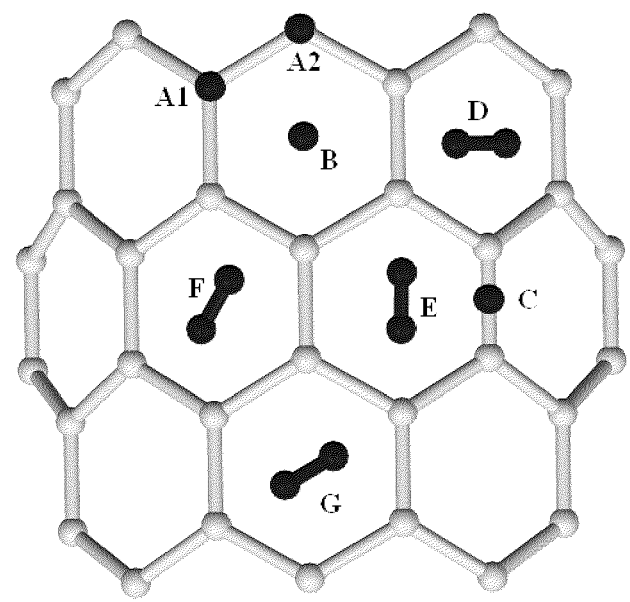
FIG. 3(a) illustrates different adsorption sites for a hydrogen molecule on a segment of single walled zigzag type nanotubes.

Previous studies have shown that different $H_2$ orientations to CNT wall show different binding energies. The curvature of the nanotube induces some $sp^2$ re-hybridization effects. Bond angles between carbon atoms decrease with increasing tube curvature. This causes the delocalized ring of electrons in the π orbitals to become less delocalized above carbon atoms, thus altering the electron density of the carbon nanotube. Consequently, the binding properties of the $H_2$ will change with the electron density, since physisorption is governed by electrostatic forces and van der Waals (e.g., induced dipole-induced dipole). For zigzag (n, 0) CNT, we considered 7 different adsorption sites A-G in FIG. 3(a). The distance is measured between the center of mass of the hydrogen molecule and the nanotube wall. Sites A-C are aligned with the hydrogen molecular axis normal to the CNT wall, while sites D-G are aligned with the hydrogen axis parallel to the CNT wall. Specifically, site A: $H_2$ points to a carbon atom; site B: $H_2$ is above the center of a hexagon of carbon atoms; site C: $H_2$ is above the midpoint of a C—C bond; site D: the $H_2$ lies above the midpoints of the C—C bonds with $H_2$ perpendicular to the tube axis; site E, the $H_2$ lies across two opposing carbon atoms with $H_2$ parallel to the tube axis; site F: $H_2$ is parallel to the CNT with the 2 hydrogen atoms pointing to the C—C bond; site G: $H_2$ is parallel to the CNT with the 2 hydrogen atoms pointing to carbon atoms. Generally, the adsorption sites can be summarized into three categories: hollow ($H_2$ lies above the center of a hexagon of carbon atoms), bridge ($H_2$ lies above C—C bond), and top ($H_2$ lies a carbon atom).

FIG. 3 illustrates different adsorption sites for a hydrogen molecule on a segment of SWNTs for (a) zigzag and (b) armchair. All C—C bonds are sp2 hybridized.

Figure 3B:
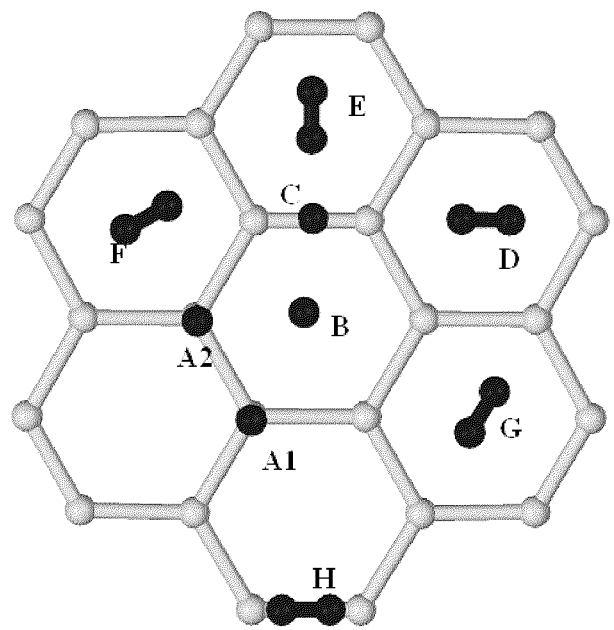
FIG. 3(b) illustrates different adsorption sites for a hydrogen molecule on a segment of single walled armchair type nanotubes.

For armchair (n, n) CNT, Arellano et al have considered three adsorption sites, including two parallel configurations with (a) the axis of the $H_2$ molecule above a C—C bond and (b) above a hexagon with the molecular axis parallel and a perpendicular site with $H_2$ pointing to the center of hexagon surface. In our work, to better study the effect of the adsorption sites, we considered more sites, as shown in FIG. 3(b). Actually, FIGS. 3(a) & (b) are quite similar, and in FIG. 3(b), we included another site H in which the axis of the $H_2$ molecule is just above a C—C bond in parallel position.

First, we considered the optimized $H_2$-CNT distance and binding energies of internal adsorption for zigzag (9, 0) and (10, 0) CNTs predicted by SCC-DFTB-D, as shown in Table 1. For comparison, we also list the results of DFT/LDA reported by Henwood and Carey. For a typical semiconducting (10, 0) CNT with diameter of 7.8 Å, we found that parallel adsorption sites (D-F) are more favorable than perpendicular configurations (A-C). The larger binding energies of the parallel configurations can be explained by the nature of the hydrogen molecule's electronic structure. The optimized $H_2$-CNT distances of perpendicular configurations are 10% longer than that of parallel configurations. There is no significant difference (within 7 mV) in terms of binding energies, indicating that the change in adsorption sites and equilibrium distance has little effect on the binding energies of internal physisorbed hydrogen.

TABLE 1

Optimized distance (D, Å) and binding energies ($E_b$, eV) of $H_2$ inside the (10, 0) and (9, 0) CNTs by SCC-DFTB-D and DFT/LDA methods.

| | (10, 0) CNT | | | | (9, 0) CNT | | | |
|---|---|---|---|---|---|---|---|---|
| | SCC-DFTB-D | | DFT/LDA[a] | | SCC-DFTB-D | | DFT/LDA[a] | |
| | D | $E_b$ | D | $E_b$ | D | $E_b$ | D | $E_b$ |
| A1 | 3.4 | −0.166 | 3.0 | −0.143 | 3.5 | −0.213 | 3.2 | −0.187 |
| A2 | 3.4 | −0.165 | 3.0 | −0.143 | 3.5 | −0.212 | 3.2 | −0.186 |
| B | 3.2 | −0.167 | 2.9 | −0.150 | 3.3 | −0.214 | 3.1 | −0.191 |
| C | 3.4 | −0.167 | 2.9 | −0.151 | 3.5 | −0.214 | 3.1 | −0.191 |
| D | 3.0 | −0.172 | 2.8 | −0.157 | 3.2 | −0.214 | 3.0 | −0.193 |
| E | 3.0 | −0.168 | 2.8 | −0.152 | 3.3 | −0.211 | 2.9 | −0.186 |
| F | 3.0 | −0.169 | 2.8 | −0.154 | 3.2 | −0.212 | 2.9 | −0.188 |
| G | 3.0 | −0.171 | 2.8 | −0.156 | 3.3 | −0.213 | 2.9 | −0.192 |

For a metallic (9, 0) CNT, we got similar results as (10, 0) CNT, and it should be noticed that the difference (with 3 mV) of binding energy is negligible. By comparing $H_2$ internal adsorption to (9, 0) and (10, 0) CNTs, we can get the following results:

(1), the optimized $H_2$-CNT distances in (9, 0) are longer (more than 10%) that that in (10, 0) CNTs. (2), The binding energies for the (9, 0) nanotube, calculated using the by SCC-DFTB-D, are stronger than those for the (10, 0) by an average of 50 meV by SCC-DFTB-D (LDA/CA predict 40 meV).

Comparing the data predicted by SCC-DFTB-D and DFT/LDA methods, we find that SCC-DFTB-D predict about 10% longer $H_2$-CNT distance than DFT/LDA, while at the same time larger binding energy. The discrepancy between SCC-DFTB-D and LDA can be explained by the shortcoming of LDA. It is well known that LDA usually underestimates the equilibrium distance. In addition, LDA fails to consider the dispersion energy. Our SCC-DFTB-D methods accurately considered the dispersion energy, and can deal with the curvature effect reasonably and demonstrate more obvious curvature effect.

Then, we considered the binding energies for externally adsorbed hydrogen on (9, 0) and (10, 0) CNTs, and the results are summarized in Table 2. All external binding energies are much smaller compared with the binding energies of hydrogen physisorbed inside the nanotubes. The decreased binding strength is due to a decrease of interaction between the hydrogen and the nanotube. Our SCC-DFTB-D still predicts longer $H_2$-CNT distance (especially for the parallel configurations) than DFT/LDA, while at the same time smaller binding energy. But the general trend of the stable configuration predicted by SCC-DFTB-D and DFT/LDA is still similar.

TABLE 2

Optimized distances (Å) and binding energies (eV) of $H_2$ outside the (10, 0) and (9, 0) CNTs by SCC-DFTB-D and DFT/LDA methods.

| | (10, 0) CNT | | | | (9, 0) CNT | | | |
| --- | --- | --- | --- | --- | --- | --- | --- | --- |
| | SCC-DFTB-D | | DFT/LDA[a] | | SCC-DFTB-D | | DFT/LDA[a] | |
| | D | $E_b$ | D | $E_b$ | D | $E_b$ | D | $E_b$ |
| A1 | 3.0 | −0.0518 | 2.9 | −0.0629 | 3.1 | −0.0503 | 2.9 | −0.0627 |
| A2 | 3.0 | −0.0522 | 2.9 | −0.0631 | 3.0 | −0.0521 | 2.9 | −0.0628 |
| B | 3.1 | −0.0568 | 2.7 | −0.0792 | 3.2 | −0.0561 | 2.7 | −0.0798 |
| C | 3.2 | −0.0489 | 3.0 | −0.0603 | 3.2 | −0.0480 | 3.0 | −0.0599 |
| D | 3.1 | −0.0601 | 2.6 | −0.0826 | 3.1 | −0.0596 | 2.6 | −0.0825 |
| E | 3.0 | −0.0618 | 2.5 | −0.0900 | 3.1 | −0.0612 | 2.5 | −0.0920 |
| F | 3.0 | −0.0614 | 2.6 | −0.0880 | 3.1 | −0.0611 | 2.5 | −0.0892 |
| G | 3.1 | −0.0612 | 2.6 | −0.0845 | 3.1 | −0.0606 | 2.6 | −0.0848 |

TABLE 3

Optimized distances (Å) and binding energies (eV) of $H_2$ on (5, 5) and (6, 6) CNTs both internally and externally predicted by SCC-DFTB-D method.

| | (5, 5) CNT | | | | (6, 6) CNT | | | |
| --- | --- | --- | --- | --- | --- | --- | --- | --- |
| | Internal | | External | | Internal | | External | |
| | D | $E_b$ | D | $E_b$ | D | $E_b$ | D | $E_b$ |
| A1 | 3.4 | −0.221 | 3.0 | −0.0527 | 3.3 | −0.150 | 3.0 | −0.0534 |
| A2 | 3.5 | −0.225 | 3.0 | −0.0527 | 3.4 | −0.153 | 3.0 | −0.0526 |
| B | 3.4 | −0.225 | 3.1 | −0.0561 | 3.3 | −0.153 | 3.1 | −0.0571 |
| C | 3.4 | −0.225 | 3.2 | −0.0512 | 3.3 | −0.153 | 3.2 | −0.0523 |
| D | 3.4 | −0.225 | 2.9 | −0.0592 | 3.1 | −0.159 | 2.9 | −0.0604 |
| E | 3.3 | −0.226 | 2.9 | −0.0605 | 3.1 | −0.155 | 2.9 | −0.0617 |
| F | 3.4 | −0.226 | 2.9 | −0.0596 | 3.1 | −0.158 | 2.9 | −0.0607 |
| G | 3.4 | −0.226 | 2.9 | −0.0603 | 3.1 | −0.157 | 2.9 | −0.0616 |
| H | 3.4 | −0.225 | 3.1 | −0.0517 | 3.1 | −0.158 | 3.1 | −0.0533 |

Table 3 lists the optimized $H_2$-CNT distance and binding energies for armchair (5, 5) and (6, 6) CNTs predicted by SCC-DFTB-D method. For individual (n, n) CNT, hydrogen placed inside the nanotubes has a much larger binding energy than externally bound hydrogen. For (5, 5) CNT, the internal binding energy is 4 times larger than the external binding. For (6, 6) CNT, the internal binding energy is 2.5 times larger than the external binding. For internal adsorption, there is obvious difference (76 meV) in terms of binding energy between (5, 5) and (6, 6) CNTs. As the nanotube radius decreases, the increased interaction surpasses the effect of the change in $H_2$ orientation. While for external adsorption, there is negligible binding energy difference of about 1 meV, and the binding for $H_2$/(6, 6) CNT is energetically more stable than $H_2$/(5, 5) CNT.

By comparing Tables 1, 2 and 3 the following results about the selectivity of adsorption sites can be received: (1), for external adsorption, for both parallel and perpendicular configurations, although the energy difference is very small, the hollow site is more preferable than the other sites; (2) for internal adsorption, there are no specific site which is more favorable than other sites; (3) when $H_2$ is externally noncovalent bonded to CNTs, for one certain adsorption site, the optimized $H_2$-CNT distances are quite similar for different chiralities and curvatures with the largest difference 0.2 Å. For example, the equilibrium $H_2$-CNT distances for site C are 3.20 Å for all the four tubes considered in Tables 1-3. The similar finding is also found for internal adsorption. The results demonstrate that for equilibrium $H_2$-CNT distances are insensitive to the tube diameter and chirality. Our finding is that parallel adsorption sites are more stable than perpendicular configurations.

Here we should emphasize that for physisorption based methods, the adsorption energy and equilibrium distance due to van der Waals interaction are among the crucial factors that determine the storage capacity.

Variation of Potential Energy with the Binding Distance

Figure 4:
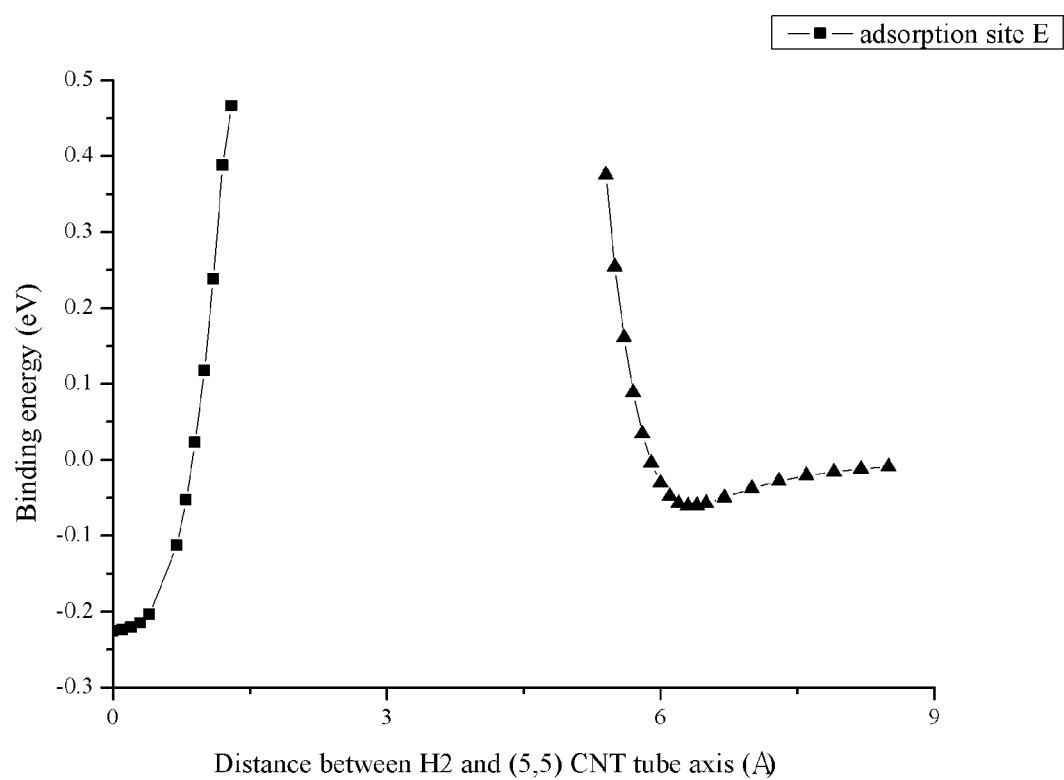
FIG. 4 is a graph showing variation of potential energy with the separation between the (5, 5) CNT and the center of mass of $H_2$ in site E with the tube axis set zero.

FIG. 4 shows the potential energy plotted as a function of the $H_2$ and (5, 5) CNT distance for adsorption site E: the hydrogen molecule parallel to tube axis, lying above the center of the hexagon of carbon atoms. This figure is obtained in single-point calculations in which the $H_2$ and (5, 5) CNT are kept frozen, and only the distances between the $H_2$ and (5, 5) CNT the SWNT axis is varied. The curves in FIG. 4 demonstrate the typical form of a Lennard-Jones potential: an attractive region at long range and a repulsive region at short distances. At large distances, the interaction energy is small and grows steadily negative (attractive) as the hydrogen molecule is moved closer to the CNT layer. As the hydrogen passes the binding-energy maximum, the Pauli repulsion interactions start to dominate.

The attraction between $H_2$ and CNT begins at a distance around 2.6 Å from the tube wall for both internal and external adsorptions. For internal adsorption, the inner binding maximum (−0.23 eV) lies at the nanotube center (3.4 Å from the tube wall). As $H_2$ approaches the CNT wall, the positive binding energy increases sharply. For external adsorptions, there is a maximum for the binding energy (−0.061 eV) at a distance of 6.3 Å from the tube axis (2.9 Å from the nanotube wall). The binding energy decreases sharply below this distance, demonstrating increasing repulsion between $H_2$ and CNT wall. When the distance is longer than the equilibrium distance of 2.9 Å, the binding energy decreases (not sharply) as the distance increases. The largest binding energies outside the nanotube is −0.061 eV, consistent with previous findings. The binding energy is also consistent with the values used in the empirical potentials, which range from −0.03 to −0.05 eV. It is reported previously that the equilibrium distance and binding energy for $H_2$ parallel adsorbed to (5, 5) CNT to be 2.7 Å and −0.068 eV, respectively by using DFT/LDA.

Binding Energy Against Tube Diameter

Figure 5A:
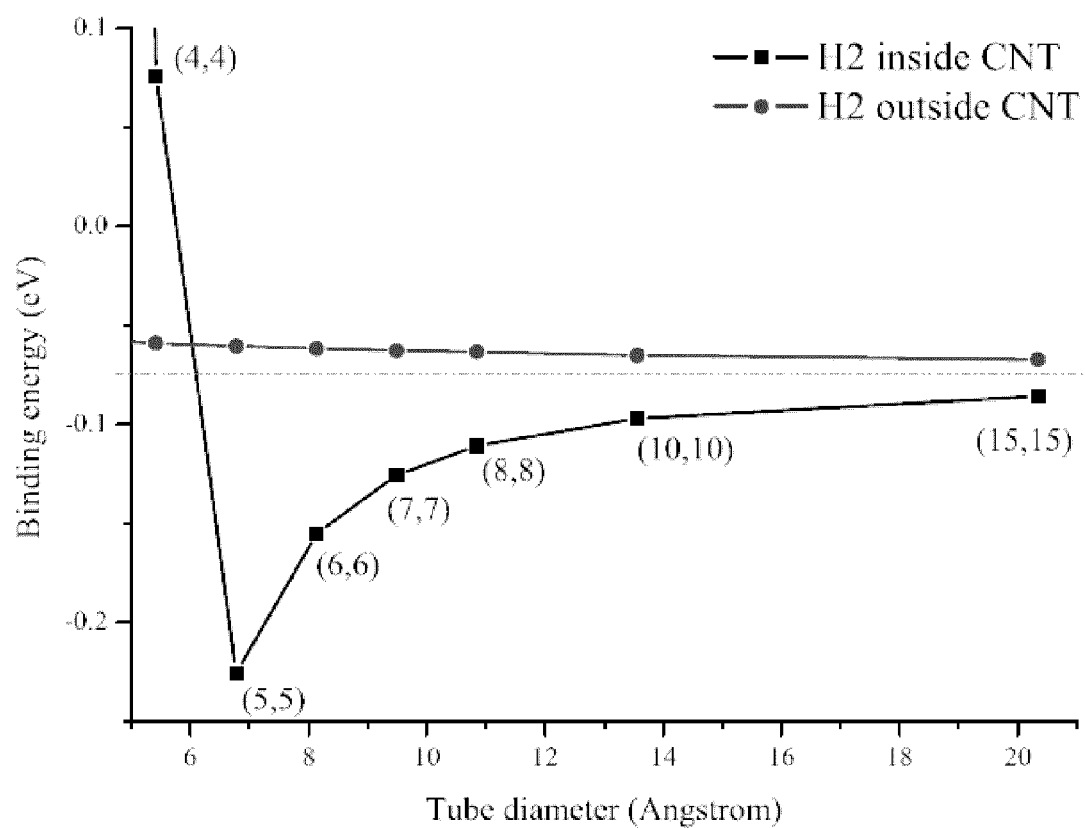
FIG. 5(a) is a graph showing the optimized binding energies of molecular hydrogen internally and externally adsorbed to armchair (n, n) carbon nanotubes for parallel configuration.

The optimized binding energies of $H_2$ inside and outside armchair (n, n) CNTs with diameters ranging from 5.4 Å to 20.3 Å for parallel (a) and perpendicular (b) configurations are shown in FIGS. 5(a) and (b) respectively. The results correspond to the adsorption sites E and B in FIG. 3(b). It should be noted that both configurations show quite similar equilibrium distances and binding energies (as shown in Tables 1, 2 and 3), and more importantly, the general trends of binding energies vs tube diameter are almost the same for both configurations. Since the parallel adsorption here is slightly more preferable than perpendicular one and is more consistent with the experimental binding, we will focus our analysis on the parallel configurations of $H_2$ above the hexagonal carbon atoms.

As the tube diameter increases, the effect of curvature will decrease, and finally the CNT wall will be like a graphene surface. So we also investigated the binding energy for $H_2$/graphene complex. When a $H_2$ interacts with coronene molecule ($C_{24}H_{12}$) with 7-fused benzene at a parallel configuration above the hexagon ring, the binding energy increased to −0.066 eV. It was reported by that the graphene-$H_2$ interaction is only 0.8 kJ/mol stronger than that of coronene with $H_2$. So, we conjecture that the binding energy for $H_2$/grapheme should be −0.074 eV, which is consistent with the MP2 results reported.

Figure 5B:
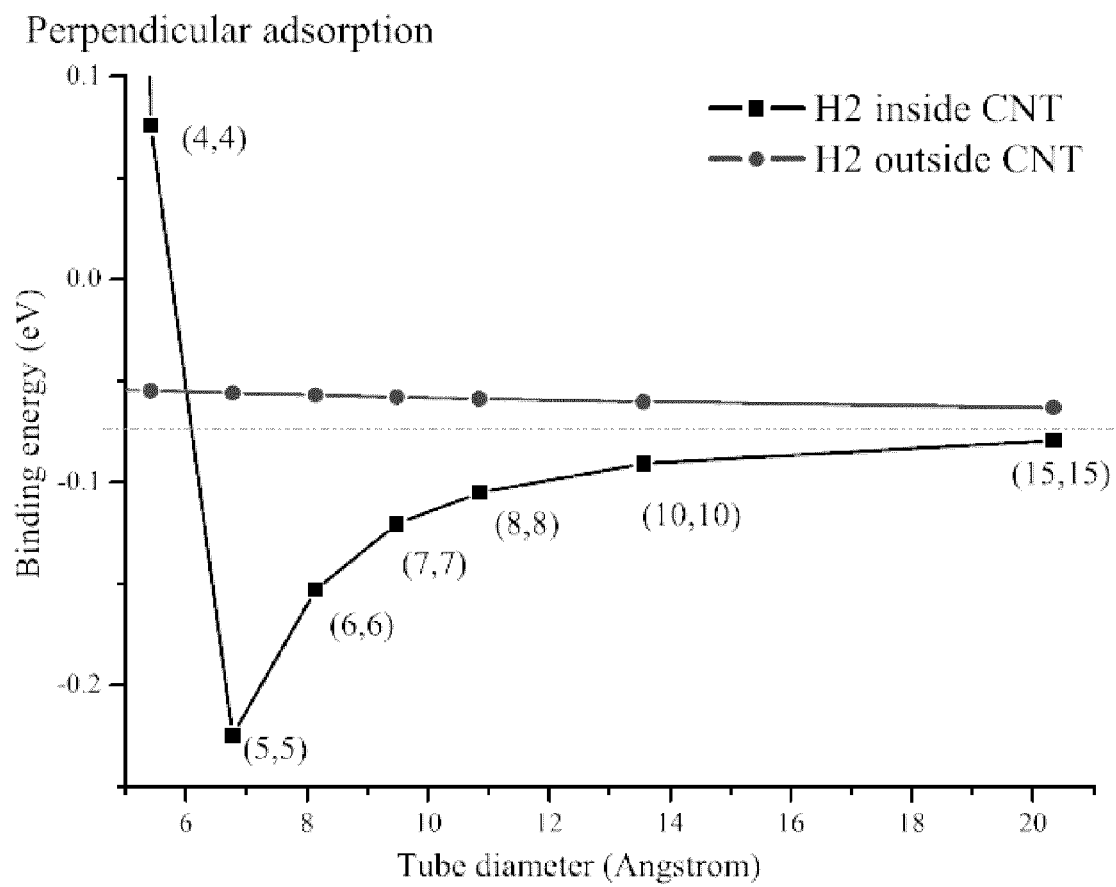
FIG. 5(b) is a graph showing the optimized binding energies of molecular hydrogen internally and externally adsorbed to armchair (n, n) carbon nanotubes for perpendicular configuration.

For external adsorption of $H_2$ to the armchair CNT wall, we can find the following results from FIG. 5: (1), as the armchair diameter increases from 5.40 Å for (4, 4) CNT to 20.30 Å for (15, 15) CNT, the binding energies are slightly increased from −0.057 eV to −0.067 eV. And the physisorption binding energy of $H_2$ adsorbed to (n, n) CNT will always be smaller than that of $H_2$ on planar graphene surface, which is predicted to be −0.074 eV. For small diameter (4, 4) CNT, the binding is 20% smaller than that on graphene. For the largest diameter (15, 15) CNT considered in our study, the binding energy is 10% lower than that on graphene. (2), the binding increasing rate is gradually decreasing, which means that as the armchair diameter increase, the curvature effect of CNT is decreasing. As the CNT diameter is large enough with the curvature effect negligibly small, the binding energy will be quite similar to $H_2$/graphene. And (3), the binding trend for external adsorption predicted by SCC-DFTB-D is quite similar to those predicted by high level MP2 method, demonstrating the reliability of our methods.

For internal adsorption, since we considered a wider range of tube diameters. Our calculations show that the binding energy as a function of the armchair diameter is not decreasing or increasing for the whole range. Actually, it shows the typical form of the Lennard-Jones potential. For the smallest (3, 3) CNT with diameter of just 4.0 Å, the interaction energy is as large as 2.9 eV, demonstrating strong repulsion between $H_2$ and CNTs. For better comparison of the external trend, we did not plot (3, 3) CNT in FIG. 5, since the internal binding energy for (3, 3) CNT is much larger than other tubes. For the second smallest (4, 4) CNT with diameter of 5.4 Å, the binding energy sharply drops to 0.08 eV, still demonstrating repulsion between $H_2$ and CNTs. The attraction between $H_2$ and CNTs starts as the tube diameter larger than 5.4 Å. For (5, 5) CNT, the negative binding energy sharply increased to −0.23 eV, which is the binding maximum for the entire armchair CNTs considered in this work. Starting from (6, 6) CNT, the binding begins to decrease slightly from −0.16 eV for (6, 6) CNT to −0.086 eV for (15, 15) CNT. We conjecture that the binding will still decrease as the diameter increases, but always larger than that of $H_2$ on planar graphene surface of −0.074 eV.

Physisorption inside armchair SWNTs would always be higher than that on planar graphene generally, except for (3, 3) and (4, 4) CNT. Hydrogen placed inside the nanotube has a larger binding energy than externally bound hydrogen, by multiplying a factor of >1. As the diameter increases, the factor decreases and approaches 1, which means that the internal and external binding energies are both becoming similar as the binding of $H_2$ on planar graphene. For (5, 5) CNT the factor is 4, while for (15, 15) CNT, the factor is just 1.3.

Figure 6A:
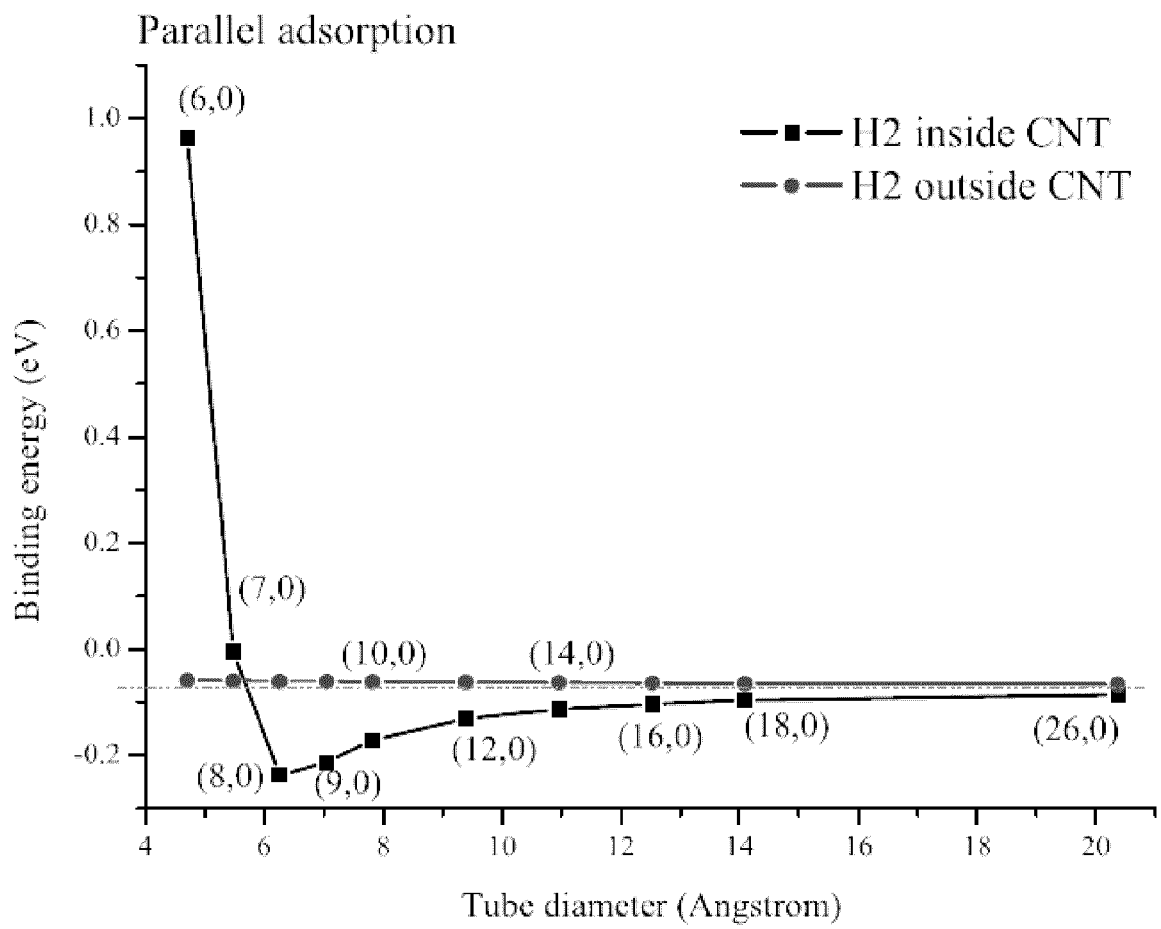
FIG. 6(a) is a graph showing optimized binding energies of molecular hydrogen internally and externally adsorbed to zigzag (n, 0) CNTs for parallel configuration.
Figure 6B:
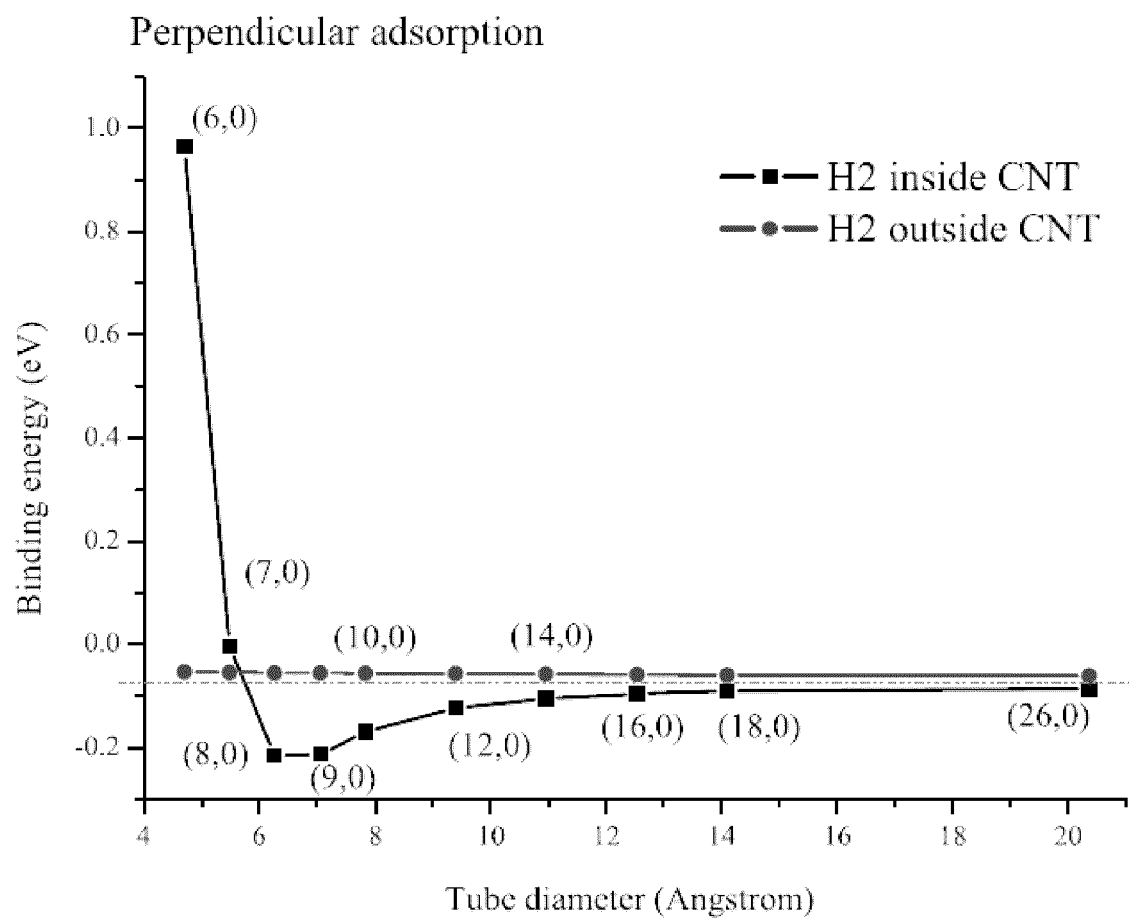
FIG. 6(b) is a graph showing optimized binding energies of molecular hydrogen internally and externally adsorbed to zigzag (n, 0) CNTs for perpendicular configuration.

FIG. 6 shows the binding energies of $H_2$ inside and outside zigzag (n, 0) CNTs with diameters ranging from 4.7 Å to 20.3 Å for parallel E (a) and perpendicular B (b) configurations. Comparing FIGS. 5 and 6, general trends and results for $H_2$ physisorption on zigzag (n, 0) CNTs are quite similar to that for $H_2$ physisorption on armchair (n, n) CNTs. For internal adsorption, there is a binding maximum at (8, 0) CNT with diameter of 6.30 Å. It should be pointed that for (8, 0) and (9, 0) CNTs with a small difference in diameter of just 0.8 Å, the binding energies are quite similar.

We also investigated the chirality effect. We compared the data for two CNTs with similar tube diameter: medium diameter of (7, 7) and (12, 0) CNTs, and largest diameter of (15, 15) and (26, 0) CNTs, and the results are shown in Table 4.

TABLE 4

Chirality effect on the binding energy for both internal and external adsorption of $H_2$ on CNTs.

| CNT chirality | Diameters (Å) | External binding (eV) parallel | perpendicular | Internal binding (eV) parallel | perpendicular |
|---|---|---|---|---|---|
| (7, 7) | 9.49 | −0.0627 | −0.0581 | −0.126 | −0.121 |
| (12, 0) | 9.39 | −0.0627 | −0.0577 | −0.131 | −0.124 |
| (15, 15) | 20.34 | −0.0673 | −0.0633 | −0.0859 | −0.0794 |
| (26, 0) | 20.36 | −0.0666 | −0.0613 | −0.0865 | −0.0807 |

It can be seen from Table 4 that for both external and internal adsorptions, the binding energies for corresponding zigzag and armchair CNTs are almost the same, indicating negligible effect of the tube chirality. For (6, 3) and (8, 0), (6, 4) and (5, 5) with similar tube diameters, we got the quite similar results. So we can conclude that the chirality of the armchair and zigzag CNTs has negligible effect on the binding energies, which is consistent with previous results.

Now we will explain the finding that external binding energy for CNTs is always smaller than that for graphene, and at the same time internal binding energy for CNTs is always larger (except for (4, 4), (6, 0) and (7, 0) CNTs with very small diameters) than that for graphene. The optimized distance between the $H_2$ and CNT wall (carbon atoms) and the number of carbon atoms interacting with $H_2$ are two important factors that determine the final binding energies of the physisorbed system. When $H_2$ interacts with CNT externally, nanotube wall curves away from the hydrogen, resulting in a longer equilibrium $H_2$—C distance and a decrease amount of interactions between the hydrogen and the carbon nanotube atoms. Thus the binding energy will be smaller than that for graphene. Conversely, for internally placed hydrogen, the nanotube curves toward the hydrogen, leading to shorter equilibrium $H_2$—C distance and increased interaction and larger binding energy than $H_2$/graphene.

The potential energy surface as a function of the $H_2$-CNT distance demonstrates typical form of a Lennard-Jones potential. As the $H_2$ approaches the CNT tube with short distance, the Pauli repulsion interactions start to dominate. For the internal adsorption of $H_2$, the attraction begins at a distance of around 2.6 Å and the binding maximum is at 3.4 Å from the tube wall. For (3, 3) CNT with the smallest diameter of 4 Å, the $H_2$ molecule lies on the tube axis, with the distance of 2 Å to the tube wall, and such a short distance leads to strong repulsion from both sides. For (4, 4) CNT with a diameter of 5.4 Å, the $H_2$ is found lie on the tube axis. At this longer distance (2.7 Å), $H_2$ still lies in the repulsive region from both sides. And the repulsion from both sides is much smaller with a small repulsion energy of 0.076 eV. For the binding maximum of (5, 5) CNT with a diameter of 6.8 Å, the $H_2$ molecule still lies on the tube axis, which means the $H_2$ is 3.4 Å from the tube wall. This suitable distance means that $H_2$ molecule is in the favorable attractive region from both sides, resulting in the strong binding. For (6, 6) and other armchair CNT, the maximum binding position for $H_2$ inside the nanotube does not occur at the position of the tube axis, which means that $H_2$ is near one side, while far away from the other side of the CNT wall. For both sides, the $H_2$ lies in the attractive region, however, for the CNT side that $H_2$ approaches near (around 3.0 Å), the binding between $H_2$ and CNT are favorable. While for the other side which is around 5.0 Å from the $H_2$, the binding is much weaker. Considering the total attraction from all sides, the bind energy for $H_2$ and (6, 6) CNT is obviously smaller than that of $H_2$ and (5, 5) CNT, and the binding will still decrease for $H_2$ and (n, n) CNT with increasing diameters.

Prediction of the Optimum CNTs for Hydrogen Storage

From the above results we propose that CNTs with a diameter around 5 Å-7.9 Å and in particular 6-7 Å such as (5, 5), (8, 0), and (6, 3) tubes, are optimum for physisorption of $H_2$. In this relatively narrow range of diameters, the internal adsorption binding energies are unexpectedly high as shown by the maxima in the graphs of FIGS. 5(a), 5(b), 6(a) and 6(b). This contrasts with the more steady variation of external binding energy for hydrogen outside the CNT.

The internal binding energy for tubes having a diameter 6-7 Å is around −0.22 eV, which is 3 times larger than that of $H_2$ on graphene surface; for external adsorption, the bindings are all −0.061 eV, which is just 18% bellow that of $H_2$ on graphene surface.

While a preferred embodiment of the invention has been described above with reference to the drawings, the detailed description and drawings are not to be taken to limit the scope of the present invention which is defined by the claims.

The invention claimed is:

1. A method of storing hydrogen, comprising storing hydrogen in a plurality of carbon nanotubes having a diameter range from 0.6 nm to 0.8 nm, wherein a full width at half maximum (FWHM) distribution of the diameter of the carbon nanotubes is greater than zero but equal to or less than 0.2 nm.

2. The method of claim 1, wherein the range is from 0.6 nm to 0.75 nm.

3. The method of claim 1, wherein at least one of the carbon nanotubes consists of pure carbon.

4. The method of claim 1, wherein the carbon nanotubes comprise at least one of an armchair tube, zigzag tube and a chiral tube.

5. The method of claim 1, wherein the hydrogen comprises uncompressed gaseous hydrogen, compressed gaseous hydrogen or liquid hydrogen.

6. The method of claim 1, further comprising releasing the hydrogen from storage in the carbon nanotubes by heating and/or reducing pressure.

7. The method of claim 1, wherein the carbon nanotubes comprise at least one single walled nanotube.

8. The method of claim 1, wherein the FWHM distribution is greater than zero but equal to or less than 0.1 nm.

9. A container for storing hydrogen, the container comprising a plurality of carbon nanotubes having a diameter in a range from 0.6 nm to 0.8 nm, wherein a full width at half maximum (FWHM) distribution of the diameter of the carbon nanotubes is greater than zero but equal to or less than 0.2 nm.

10. The container of claim 9, wherein the container comprises a first material other than carbon nanotubes, and wherein the carbon nanotubes are situated inside the first material for adsorbing hydrogen.

11. The container of claim 9, wherein the range is from 0.6 nm to 0.75 nm.

12. The container of claim 9, wherein at least one of the carbon nanotubes consists of pure carbon.

13. The container of claim 9, wherein the carbon nanotubes comprise at least one of an armchair tube, a zigzag tube, and a chiral tube.

14. The container of claim 9, wherein the container is capable of storing hydrogen in uncompressed gaseous, compressed gaseous or liquid form.

15. The container of claim 14, further comprising a device for varying pressure and/or temperature within the container.

16. The container of claim 9, wherein the carbon nanotubes comprise at least one single walled nanotube.

17. The container of claim 9, further comprising hydrogen stored in the container.

18. The container of claim 9, wherein the FWHM distribution is greater than zero but equal to or less than 0.1 nm.

19. The method of claim 1, wherein the storing comprises physisorbing the hydrogen inside the carbon nanotubes.

* * * * *